(12) United States Patent
Omori et al.

(10) Patent No.: US 8,000,733 B2
(45) Date of Patent: Aug. 16, 2011

(54) MOBILE COMMUNICATION TERMINAL AND TRANSMISSION POWER CONTROLLING METHOD

(75) Inventors: Hiroo Omori, Yokohama (JP); Yukihiko Okumura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 764 days.

(21) Appl. No.: 11/959,066

(22) Filed: Dec. 18, 2007

(65) Prior Publication Data
US 2008/0146162 A1 Jun. 19, 2008

(30) Foreign Application Priority Data
Dec. 18, 2006 (JP) ................ P2006-340504

(51) Int. Cl.
*H04B 7/00* (2006.01)
*H04B 17/00* (2006.01)
*H04Q 11/12* (2006.01)

(52) U.S. Cl. ............... 455/522; 455/69; 455/127.1
(58) Field of Classification Search .......... 455/522, 455/69, 127.1, 67.1
See application file for complete search history.

(56) References Cited

U.S. PATENT DOCUMENTS

| | | | | |
|---|---|---|---|---|
| 5,995,496 | A * | 11/1999 | Honkasalo et al. | 370/318 |
| 6,341,224 | B1 * | 1/2002 | Dohi et al. | 455/522 |
| 6,343,206 | B1 * | 1/2002 | Miya et al. | 455/69 |
| 6,628,924 | B1 * | 9/2003 | Miyamoto | 455/69 |
| 6,963,753 | B1 * | 11/2005 | Hamabe | 455/522 |
| 7,162,262 | B2 * | 1/2007 | Jonsson et al. | 455/522 |
| 7,440,769 | B2 * | 10/2008 | Kondo | 455/522 |
| 2002/0016177 | A1 * | 2/2002 | Miya et al. | 455/522 |
| 2004/0058699 | A1 * | 3/2004 | Jonsson et al. | 455/522 |
| 2005/0174979 | A1 * | 8/2005 | Chen et al. | 370/342 |
| 2006/0079263 | A1 * | 4/2006 | Kondo | 455/522 |
| 2006/0116153 | A1 * | 6/2006 | Sugiyama | 455/522 |

FOREIGN PATENT DOCUMENTS

| | | |
|---|---|---|
| CN | 1745523 A | 3/2006 |
| EP | 1 635 483 A1 | 3/2006 |
| JP | 3-35625 | 2/1991 |
| JP | 2003-318818 | 11/2003 |
| JP | 2005-0006190 | 1/2005 |
| JP | 2005-167710 | 6/2005 |
| JP | 2006-246045 | 9/2006 |
| JP | 2006-254506 | 9/2006 |
| JP | 2006-311131 | 9/2006 |
| WO | WO 97/34372 | 9/1997 |
| WO | WO 2004/114551 A1 | 12/2004 |
| WO | WO 2006/121089 A1 | 11/2006 |

OTHER PUBLICATIONS

Office Action issued Nov. 9, 2010, in Chinese Patent Application No. 200710199600.5 (with English-language Translation).

* cited by examiner

*Primary Examiner* — Tilahun Gesesse
(74) *Attorney, Agent, or Firm* — Oblon, Spivak, McClelland, Maier & Neustadt, L.L.P.

(57) ABSTRACT

A mobile communication terminal makes a disconnection of communications less likely to occur even in a rapidly changing wireless communication environment. The terminal includes a transmission power controller configured to measure a reception SIR, and to control a transmission power of a base station in accordance with a result of comparison between the reception SIR and a target SIR. The terminal also includes a target value updater configured to measure a reception BLER, and to update a target SIR in accordance with a measurement result. In addition, the terminal includes a measurement controller configured to acquire a moving state of the terminal to which the measurement controller belongs, and to control a period of measuring the reception BLER and control a cycle of updating the target SIR.

7 Claims, 5 Drawing Sheets

| MOVING STATE | THRESHOLD FOR DETERMINING SPEED (km/h) | SETTING PARAMETERS | |
| --- | --- | --- | --- |
| | | SIR MEASUREMENT PERIOD | BLER MEASUREMENT PERIOD |
| STATIONARY | v ≦ 0 | 1s | 10s |
| SLOWLY-MOVING | 0 < v ≦ 5 | 500ms | 1s |
| MOVING AT MEDIUM SPEED | 5 < v ≦ 60 | 300ms | 500ms |
| FAST-MOVING | 60 < v ≦ 100 | 10ms | 100ms |
| ULTRAFAST-MOVING | 100 < v | 1ms | 10ms |

FIG. 7

MOBILE COMMUNICATION TERMINAL AND TRANSMISSION POWER CONTROLLING METHOD

CROSS REFERENCE TO RELATED APPLICATION

This application is based upon and claims the benefit of priority from prior Japanese Patent Application P2006-340504 filed on Dec. 18, 2006; the entire contents of which are incorporated by reference herein.

BACKGROUND OF THE INVENTION

1. Field of the Invention

The present invention relates to a mobile communication terminal capable of controlling the transmission power of a base station, and also relates to a transmission power controlling method.

2. Description of the Related Art

In some mobile communication systems, multiple mobile communication terminals that communicate with a base station simultaneously share the same frequency bands. An example of such communication systems is a CDMA communication system. In such a system, a measure has to be taken to prevent the interference among the mobile communication terminals, and "transmission power control," in which the transmission power of the mobile terminals and that of the base station are controlled, is a specific measure conventionally employed for the purpose. A closed-loop power transmission control, which is a specific example of the transmission power control, includes inner-loop control and outer-loop control.

In the inner-loop control, the mobile communication terminal measures the instantaneous reception quality of a received signal that has been transmitted from the base station, and compares the measured instantaneous reception quality with a target value of the instantaneous reception quality. Then, the transmission power of the base station is controlled using the comparison result. As a result, the reception power of the mobile communication terminal for the signal transmitted from the base station is kept constant, and stable radio communications are accomplished. One of the generally used indicators of the instantaneous reception quality is the signal to interference power ratio (SIR).

In the outer-loop control, on the other hand, the reception quality is measured for a longer period of time than in the case of the inner-loop control. The long-term reception quality thus measured in the outer-loop control is compared with a target value of the long-term reception quality. Then, the target value of the instantaneous reception quality is updated using the comparison result. One of the generally used indicators of the long-term reception quality is the block error rate (BLER).

The length of the period for measuring each of the instantaneous reception quality and the long-term reception quality is normally fixed to a certain value. Such fixation is not suitable for tracking the fading fluctuation, which is a rapid change in the receiving power on the mobile communication terminal side. Such drastic change occurs when the mobile communication terminal moves, or when the radio wave is reflected by a building, or the like. Methods for addressing the fading fluctuation have been proposed by controlling the length of the period for measuring the received signal code power (RSCP) and the interference signal code power (ISCP), both of which is used to measure the SIR. Refer to Japanese Patent Application Laid-open Publication No. 2005-167710.

BRIEF SUMMARY OF THE INVENTION

As has been described above, in the outer-loop control, the reception quality is measured over a long period of time. Consequently, the updating cycle of the target value for the instantaneous reception quality, which is the length of time that has been passed since the last updating of the target value for the instantaneous reception quality until the current time of updating the value, becomes longer.

Such a long cycle on which the target value for the instantaneous reception quality is updated may cause an inconvenience. An inconvenience occurs in a situation where the wireless communication environment is likely to change, that is, the mobile communication terminal moves at a high speed. To be more specific, a rapid deterioration of the wireless communication environment causes a disconnection of the communications. The outer-loop control is incapable of increasing the target value for the instantaneous reception quality before the communications are disconnected.

The present invention has been made in consideration for the above-described problems inherent in the prior art. It is an object of the present invention to provide a mobile communication terminal and a transmission power controlling method to make the disconnection of the communications less likely to occur even in a rapidly changing wireless communication environment.

To accomplish the object, a first aspect of the present invention provides a mobile communication terminal. The mobile communication terminal includes a transmission power controller configured to measure a first reception quality of a signal received from a base station, and to control a transmission power of the base station in accordance with a result of comparison between the first reception quality and a target value of the first reception quality. Also included is a target value updater configured to measure a second reception quality of the received signal, and to update the target value in accordance with a measurement result of the second reception quality. In addition, the mobile communication terminal includes a measurement controller configured to acquire a moving state of the mobile communication terminal to which the measurement controller belongs, and, based on the acquired moving state, to control a period of measuring the second reception quality and a cycle of updating the target value.

The mobile communication terminal according to the first aspect controls the period of measuring the second reception quality and the cycle of updating the target value of the first reception quality in accordance with the moving state of the same mobile communication terminal. Accordingly, a disconnection of communications is made less likely to occur even in a rapidly changing wireless communication environment.

A second aspect of the present invention provides the mobile communication terminal according to the first aspect. In the terminal provided in the second aspect, the first reception quality is a reception quality used in an inner-loop control, and the second reception quality is a reception quality used in an outer-loop control.

The mobile communication terminal according to the second aspect controls the period of measuring the reception quality used in the outer-loop control and the cycle of updating the target value of the reception quality used in the inner-loop control in accordance with the moving state of the same mobile communication terminal. Accordingly, a disconnection of communications is made less likely to occur even in a rapidly changing wireless communication environment.

A third aspect of the present invention provides the mobile communication terminal according to the first aspect. In the terminal provided in the third aspect, the first reception quality is an instantaneous reception quality, and the second reception quality is a long-term reception quality. The long-term reception quality is a reception quality measured over a longer period of time than a period of time over which the instantaneous reception quality is measured.

The mobile communication terminal according to the third aspect controls the period of measuring the instantaneous reception quality and the cycle of updating the target value of the long-term reception quality in accordance with the moving state of the same mobile communication terminal. Accordingly, a disconnection of communications is made less likely to occur even in a rapidly changing wireless communication environment.

A fourth aspect of the present invention provides the mobile communication terminal according to the first aspect. In the terminal provided in the fourth aspect, the measurement controller is configured to acquire, as the moving state, a moving speed of the mobile communication terminal to which the measurement controller belongs.

A fifth aspect of the present invention provides the mobile communication terminal according to the first aspect. In the terminal provided in the fifth aspect, the transmission power controller is configured to transmit, to the base station, a control command to control the transmission power of the base station. In addition, the measurement controller is configured further to control a period of measuring the first reception quality and to control a cycle of transmitting the control command.

A sixth aspect of the present invention provides the mobile communication terminal according to the first aspect. In the terminal provided in the sixth aspect, the measurement controller is configured to change the period of measuring and the cycle of updating only on condition that a moving state acquired newly on this occasion differs from a moving state having been acquired on the previous occasion.

A seventh aspect of the present invention provides a transmission power controlling method. The controlling method includes a step of measuring a first reception quality of a signal received from a base station, and controlling a transmission power of the base station in accordance with a result of comparison between the first reception quality and a target value of the first reception quality. The controlling method also includes a step of measuring a second reception quality of the received signal, and updating the target value in accordance with a measurement result of the second reception quality. In addition the controlling method includes a step of acquiring a moving state of a mobile communication terminal that employs the controlling method, and, based on the acquired moving state, controlling a period of measuring the second reception quality and a cycle of updating the target value.

The mobile communication terminal and the transmission power controlling method that are provided according to the present invention can make the disconnection of the communications less likely to occur even in a rapidly changing wireless communication environment.

DETAILED DESCRIPTION OF THE INVENTION

Embodiments of the present invention will be described in detail with reference to the drawings. Throughout the specification and drawings, identical or similar reference numerals refer to identical or similar parts. For the convenience of description, in the following embodiments, a CDMA mobile communication system is taken as an example of mobile communication systems of the present invention.

(1) General Configuration of Mobile Communication System

Figure 1:
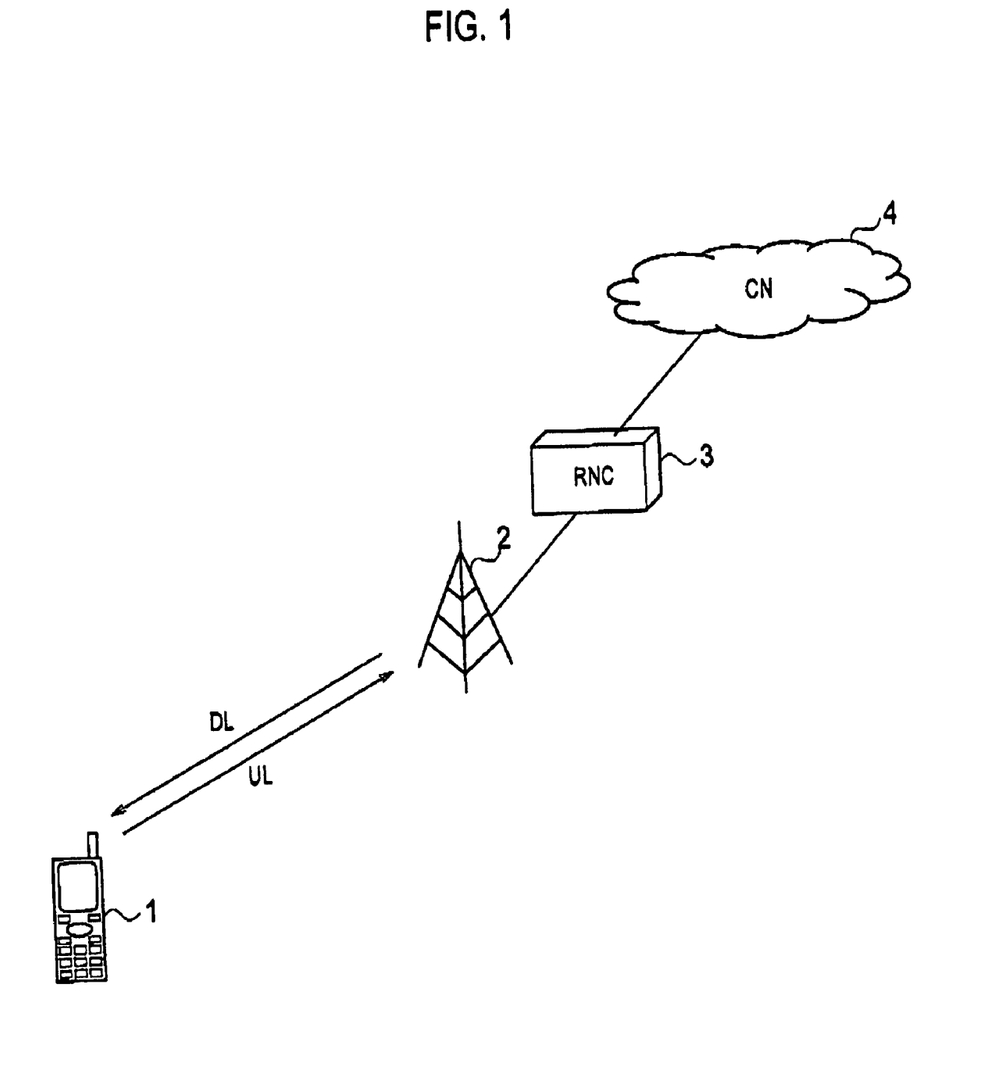
FIG. 1 shows an overall general configuration of a mobile communication system including a mobile communication terminal according to an embodiment of the invention.

FIG. 1 shows an overall general configuration of a mobile communication system including a mobile communication terminal 1 according to this embodiment.

The mobile communication system shown in FIG. 1 includes the mobile communication terminal 1, a base station 2, a radio network controller 3 (hereafter, simply referred to as "RNC 3"), and a core network 4 ("CN 4").

When the mobile communication terminal 1 is in the radio communication area of the base station 2, the mobile communication terminal 1 establishes a radio communication link with the base station 2, and communicates to other communication apparatuses via the CN 4. Here, the mobile communication terminal 1 performs the closed-loop transmission power control to control the reception power in the downlink (DL), that is, the transmission power of the base station 2.

The base station 2, under the radio-resource management by the RNC 3, communicates wirelessly to the mobile communication terminal 1. Here, the base station 2 performs the closed-loop transmission power control to control the transmission power of the mobile communication terminal 1 in the uplink (UL).

The RNC 3 serves as a host system for the base station 2, and performs, among other things, the control of the radio resources to be used by the base station 2. A function of the RNC 3 is to control the transmission power control (outer-loop transmission power control) performed by the mobile communication terminal 1. To this end, the RNC 3 controls the target BLER that is set in the mobile communication terminal 1. In an alternative configuration, the function of the RNC 3 may be incorporated into and carried out by the base station 2.

The CN 4, which is a network to perform a position control, a call control, and a service control, includes an ATM switched network, a packet switched network, a router network, and the like.

(2) Configuration of Mobile Communication Terminal

Figure 2:
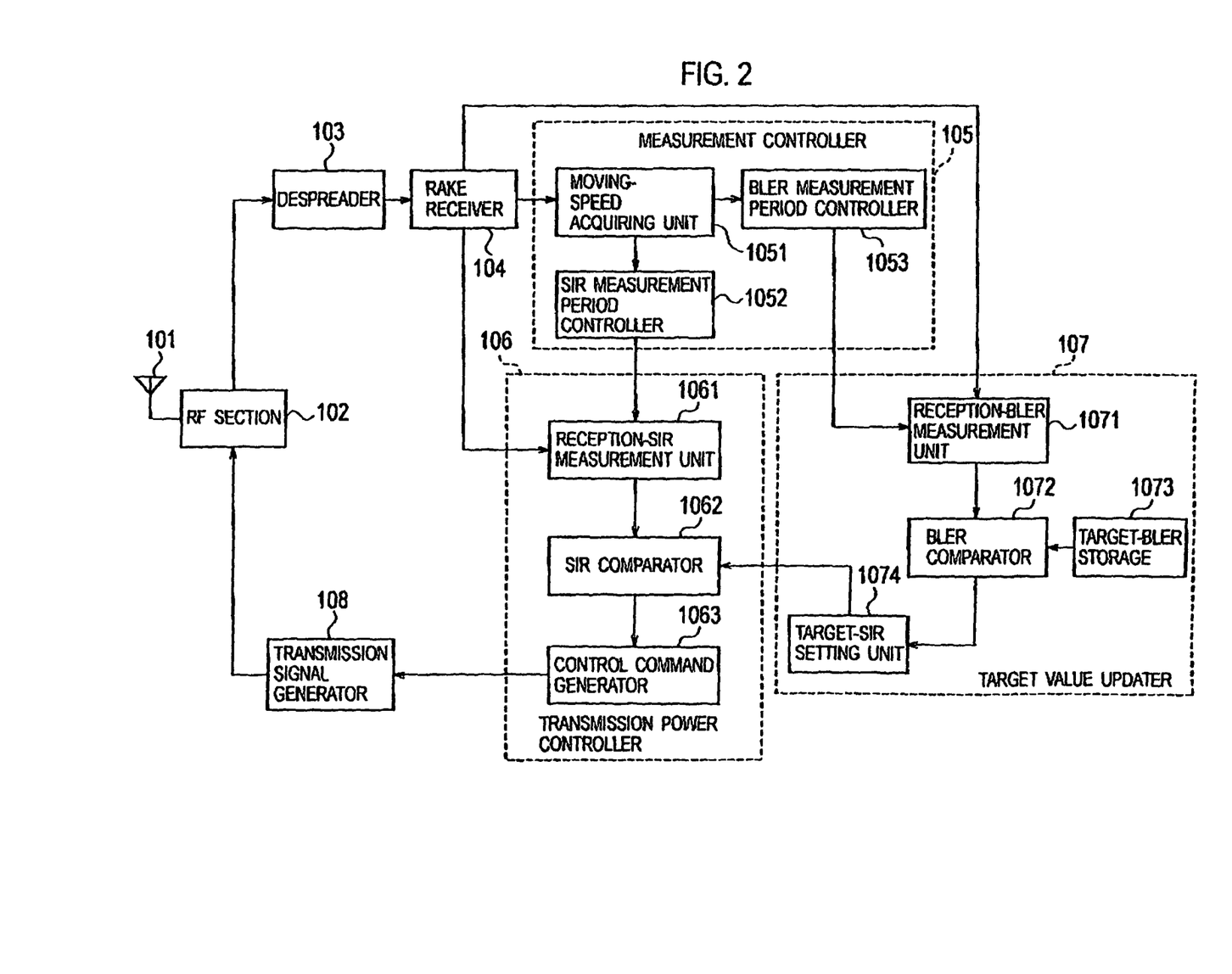
FIG. 2 is a functional block diagram showing a configuration of the mobile communication terminal according to the embodiment of the invention.

A configuration of the mobile communication terminal 1 according to this embodiment is described by referring to FIG. 2. Most of the descriptions will be given to the parts that are related to the present invention.

(2.1) General Configuration of Mobile Communication Terminal

The mobile communication terminal 1 includes an antenna 101, an RF section 102, a despreader 103, an RAKE receiver 104, a measurement controller 105, a transmission power controller 106, a target value updater 107, and a transmission signal generator 108.

When the antenna 101 receives a signal, the received signal is inputted to the RF section 102 and is downconverted. The received signal that has been downconverted is then subjected to a despreading processing in the despreader 103. Used in the processing are a scrambling code, a channelization code and the like assigned by the base station 2.

In the RAKE receiver 104, the received signal that has been despread is subjected to RAKE combining as well as to error correction decoding. The RAKE receiver 104 outputs data series that are then inputted to the measurement controller 105, the transmission power controller 106, and the target value updater 107.

In the transmission power controller 106, the reception SIR (instantaneous reception quality) is measured on the data series outputted from the RAKE receiver 104. The measured reception SIR is then compared with the target SIR, and the comparison result is used to control the transmission power of the base station 2. In short, the transmission power controller 106 performs the inner-loop control.

In the target value updater 107, the reception BLER (long-term reception quality) is measured on the data series outputted from the RAKE receiver 104. The measured reception BLER is then compared with the target BLER, and the comparison result is used to update the target SIR. In short, the target value updater 107 performs the outer-loop control.

In the measurement controller 105, the moving speed of the mobile communication terminal 1 is acquired, and the acquired speed is used to control the length of the period for measuring each of the reception SIR and the reception BLER. Detailed description will be given later for the transmission power controller 106, the target value updater 107, and the measurement controller 105.

After the data series from the RAKE receiver 104 are subjected to a quadrature demodulation, a decoding processing, and an error correction decoding, the resultant data series are converted into audio signals and image signals. The resultant signals are then outputted.

In the transmission signal generator 108, a transmission signal is generated and then is supplied to the RF section 102. In the RF section, the transmission signal is subjected to a modulation processing and to a spread spectrum processing. The signal thus processed is then upconverted, and then is transmitted to the base station 2 via the antenna 101.

(2.2) Configuration Details of Transmission Power Controller

Now, the transmission power controller 106 is described in detail. The transmission power controller 106 includes a reception-SIR measurement unit 1061, an SIR comparator 1062, and a control command generator 1063.

To the reception-SIR measurement unit 1061, the signal power value and the interfering power value are inputted from the RAKE receiver 104. On the basis of these values, the reception SIR is measured. To obtain the reception SIR, the received signal code power (RSCP) and the interference signal code power (ISCP) have to be obtained. In an example, the RSCP is obtained as the sum of mean squares of the real part and of the imaginary part of pilot symbols while the ISCP is obtained as the variances of the real part and of the imaginary part from the respective mean values of the pilot symbols.

In the SIR comparator 1062, the reception SIR measured by the reception-SIR measurement unit 1061 is compared with the target SIR set by a target-SIR setting unit 1074, which is to be described later. Whether the value of the reception SIR is not less than the value of the target SIR is determined, and the determination result is notified to the control command generator 1063.

The control command generator 1063 generates control commands in accordance with the results of the determination performed by the SIR comparator 1062. When the reception SIR is not as high as the target SIR, an "UP" command, which is a control command to increase the transmission power, is generated. In contrast, when the reception SIR is not less than the target SIR, a "DOWN" command, a control command to decrease the transmission power, is generated. The control commands generated by the control command generator 1063 are supplied to the transmission signal generator 108, and are multiplexed with the transmission signals.

(2.3) Configuration Details of Target Value Updater

Now, the target value updater 107 is described in detail. The target value updater 107 includes a reception-BLER measurement unit 1071, a target-BLER storage 1073, and a BLER comparator 1072, and the target-SIR setting unit 1074.

In the reception-BLER measurement section 1071, a CRC error detection is performed on, for example, each of the transport blocks of the data series outputted from the RAKE receiver 104. The detection results are used to measure the reception BLER.

The BLER comparator 1072 obtains a correction value for the target SIR. The correction value is made proportional to the difference between the reception BLER and the target BLER that is stored in the target-BLER storage 1073.

The target-SIR setting unit 1074, sets a target SIR to the SIR comparator 1062 in accordance with the correction value for the target SIR obtained by the BLER comparator 1062.

(2.4) Configuration Detail of Measurement Controller

Now, the measurement controller 105 is described in detail. The measurement controller 105 includes a moving-speed acquiring unit 1051, an SIR measurement period controller 1052, and a BLER measurement period controller 1053.

The moving-speed acquiring unit 1051 is configured to acquire the moving speed of the terminal to which the unit 1051 belongs in any one of the following ways (a) to (c).

(a) A first way of obtaining the moving speed uses the Doppler frequency (fd) that is calculated from the fluctuation due to Rayleigh fading (fading pitch).

(b) A second way of obtaining the moving speed uses the counts representing how many times the mobile communication terminal 1 moves between cells. In this case, the moving speed may be measured not only by the mobile communication terminal 1 but also by the base station 2. In the latter's case, the measured speed is notified to the mobile communication terminal 1.

(c) A third way of obtaining the moving speed uses the GPS, an acceleration sensor, or the like.

The SIR measurement period controller 1052 controls the reception-SIR measurement period used in the reception-SIR measurement unit 1061. Here, the control is performed in accordance with the moving speed acquired by the moving-speed acquiring unit 1051. The SIR measurement period controller 1052 controls the cycle of generating control commands in the control command generator 1063. Here, the control is performed also in accordance with the moving speed acquired by the moving-speed acquiring unit 1051.

The BLER measurement period controller 1053 controls the reception-BIER measurement period used in the reception-BLER measurement unit 1071. Here, the control is performed in accordance with the moving speed acquired by the moving-speed acquiring unit 105. The BLER measurement period controller 1053 controls the cycle of updating the target SIR in the target-SIR setting unit 1074. Here, the control is performed also in accordance with the moving speed acquired by the moving-speed acquiring unit 1051.

In the following descriptions, a generic term "setting parameters" is used for the reception-SIR measurement period, the cycle of generating control commands, the reception-BLER measurement period, and the cycle of updating the target SIR (3) Operations for Controlling Setting Parameters Now, the operations of controlling the setting parameters performed by the SIR measurement period controller 1052 and the BLER measurement period controller 1053 are described in detail.

Figure 3:
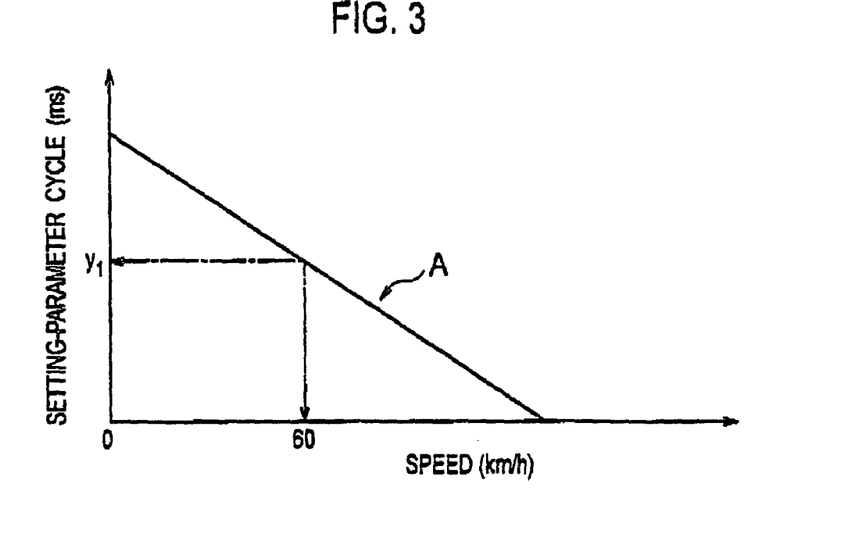
FIG. 3 describes a controlling method of setting parameters in the mobile communication terminal according to the embodiment of the invention.

As FIG. 3 shows, the SIR measurement period controller 1052 linearly (using a liner function) calculates the setting parameters (the reception-SIR measurement period and the cycle of generating the control commands) in accordance with the moving speed acquired by the moving-speed acquiring unit 1051.

Likewise, the BLER measurement period controller 1053 linearly calculates the setting parameters (the reception-BLER measurement period and the cycle of updating the target SIR) in accordance with the moving speed acquired by the moving-speed acquiring unit 1051.

FIG. 3 shows that an increase in the moving speed acquired by the moving-speed acquiring unit 1051 decreases the value of the cycle (period) of the setting parameters. Note that the FIG. 3 shows the cycle of the setting parameters on the basis of the period of time, but the cycle may be based, for example, on the number of symbols or on the number of slots.

(4) Operations of Mobile Communication Terminal

Figure 4:
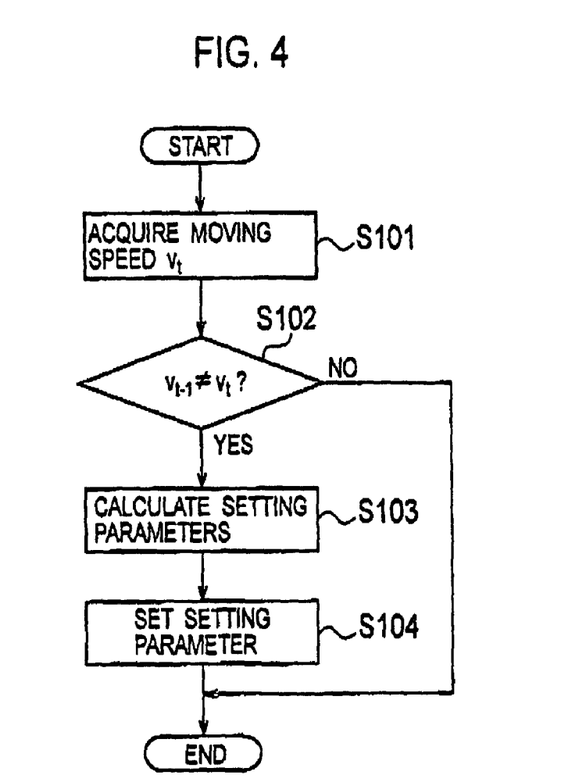
FIG. 4 shows a flow of operations of the mobile communication terminal according to the embodiment of the invention.

Now, the operations of the mobile communication terminal 1 are described with reference to FIG. 4.

In step S101, the moving-speed acquiring unit 1051 acquires the moving speed $v_t$ of the mobile communication terminal 1.

In step S102, the moving-speed acquiring unit 1051 determines whether the newly acquired moving speed $v_t$ is equivalent to the moving speed $v_{t-1}$ having been acquired on the previous occasion. When the newly acquired moving speed $v_t$ differs from the previously-acquired moving speed $v_{t-1}$, the process in step S103 has to be performed next.

In step S103, the SIR measurement period controller 1052 and the BLER measurement period controller 1053 calculates, in accordance with the principle shown in FIG. 3, the setting parameters corresponding to the moving speed acquired in step S101.

In step S104, the SIR measurement period controller 1052 sets the setting parameters (the SIR measurement period and the cycle of generating control commands) calculated in step S103 to the reception-SIR measurement unit 1061 and the control command generator 1063. Meanwhile, the BLER measurement period controller 1053 sets the setting parameters (the BLER measurement period and the cycle of updating target SIR) calculated in step S103 to the reception-BLER measurement unit 1071 and the target-SIR setting unit 1074.

Consequently, the reception-SIR measurement unit 1061 uses the SIR measurement period set by the SIR measurement period controller 1052, and thus the reception SIR is measured. Meanwhile, the control command generator 1063 uses the cycle of generating control commands set by the SIR measurement period controller 1052, and thus the control command is generated.

In addition, the reception-BLER measurement unit 1071 uses the BLER measurement period set by the BLER measurement period controller 1053, and thus the reception BLER is measured. Meanwhile, the target-SIR setting unit 1074 uses the cycle of updating the target SIR set by the BLER measurement period controller 1053, and thus the target SIR is updated.

(5) Advantageous Effects

As has been described thus far, the mobile communication terminal 1 in this embodiment controls the reception-BLER measurement period and the cycle of updating the target SIR in accordance with the moving speed of the mobile communication terminal 1. Accordingly, the disconnection of the communications is made less likely to occur even in a rapidly changing wireless communication environment.

Specifically, when the mobile communication terminal 1 moves fast, the reception-BLER measurement period is shortened. The reception BLER is thus measured with higher accuracy. In addition, when the mobile communication terminal 1 moves fast, the cycle of updating the target SIR is shortened. The tracking performance to the wireless communication environment is thus improved.

The mobile terminal 1 in this embodiment controls the reception-SIR measurement period and the cycle of generating control commands (transmission cycle) in accordance with the moving speed of the mobile communication terminal 1. Accordingly, the disconnection of the communications is made further less likely to occur even in a rapidly changing wireless communication environment.

Specifically, when the mobile communication terminal 1 moves fast, the reception-SIR measurement period is shortened. The reception SIR is thus measured with higher accuracy. In addition, when the mobile communication terminal 1 moves fast, the cycle of generating control commands (transmission cycle) is shortened. The tracking performance to the wireless communication environment is thus improved.

In addition, the setting parameters in this embodiment are changed only when the newly acquired moving speed differs from the previously-acquired one. To put it other way, the setting parameters are not changed when the newly acquired moving speed is equivalent to the previously-acquired one. Consequently, the load for processing on the mobile communication terminal 1 and the increase in the power consumption can be reduced.

First Modified Example

Figure 5:
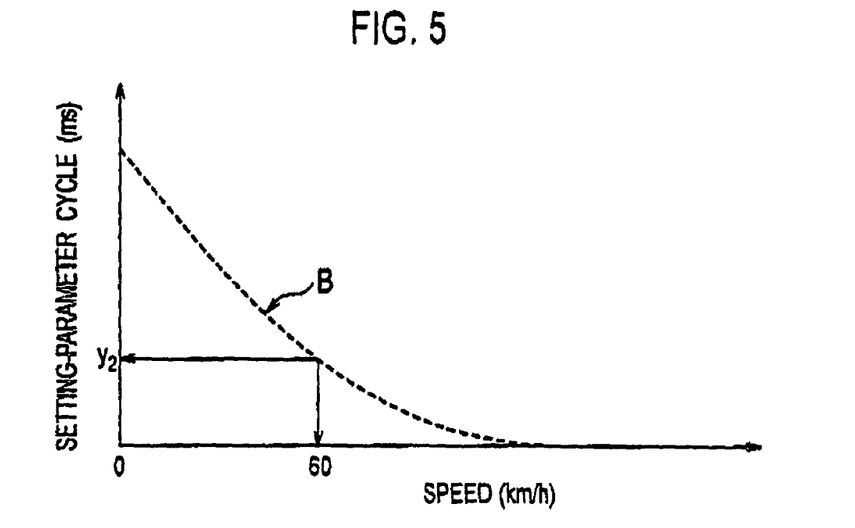
FIG. 5 describes a controlling method of setting parameters in a mobile communication terminal according to a first modified example of the invention.

The setting parameters in the above-described embodiment are calculated linearly (using a linear function) in relation to the moving speed of the mobile communication terminal 1. In this Modified Example, however, the setting parameters are, as FIG. 5 shows, calculated non-linearly.

In this modified example, the setting parameters are calculated non-linearly. Accordingly, as the mobile communication terminal 1 moves faster, the setting-parameter cycle is shortened sharply. For example, the setting-parameter cycle $y_2$ at the speed of 60 km/h in FIG. 5 has a value significantly smaller than the setting-parameter cycle $y_1$ at the speed of 60 km/h in FIG. 3.

Consequently, non-linear calculation of the setting parameters can improve the measurement accuracy of the reception SIR and the reception BLER when the moving speed of the mobile communication terminal 1 increases. In addition, the tracking performance to the wireless communication environment is thus improved.

Second Modified Example

Figure 6:
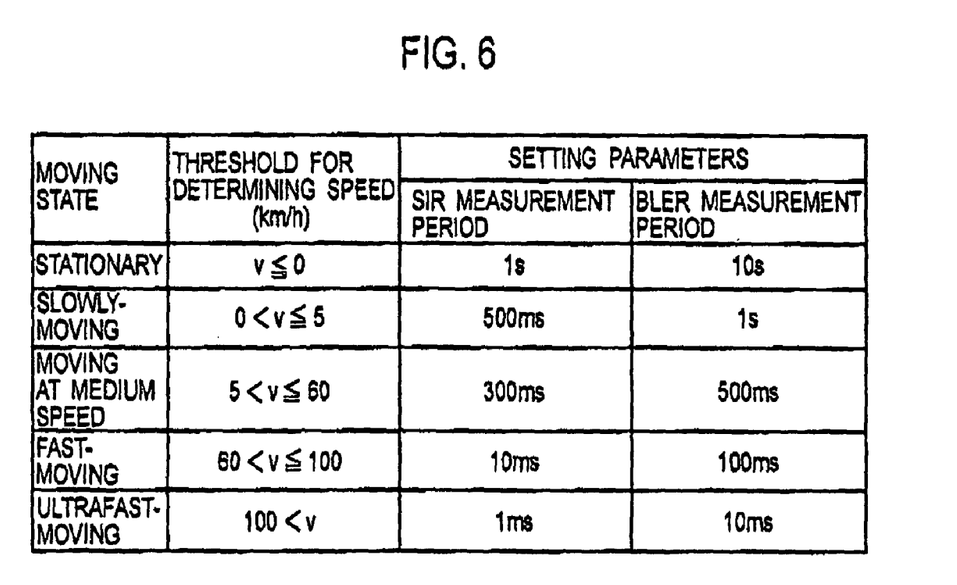
FIG. 6 describes a controlling method of setting parameters in a mobile communication terminal according to a second modified example.

In the configuration described in this modified example, the setting parameters are not calculated from the moving speed of the mobile communication terminal 1. Instead, setting parameters corresponding to the moving speed are acquired from a table that has been provided in advance.

FIG. 6 is a configuration example of a table that makes the moving speed and the setting parameters correspond to each other. The table shown in FIG. 6 includes such items as "moving state," "threshold for determining speed," and "setting parameters."

Five steps of moving state—stationary, slowly-moving, moving at medium speed, fast-moving, and ultrafast-moving—are defined. Thresholds for determining speed are defined to classify these steps of moving state. Different values for each of the setting parameters (SIR measurement period and BLER measurement period in this example) are defined in accordance with the steps of moving state.

Figure 7:
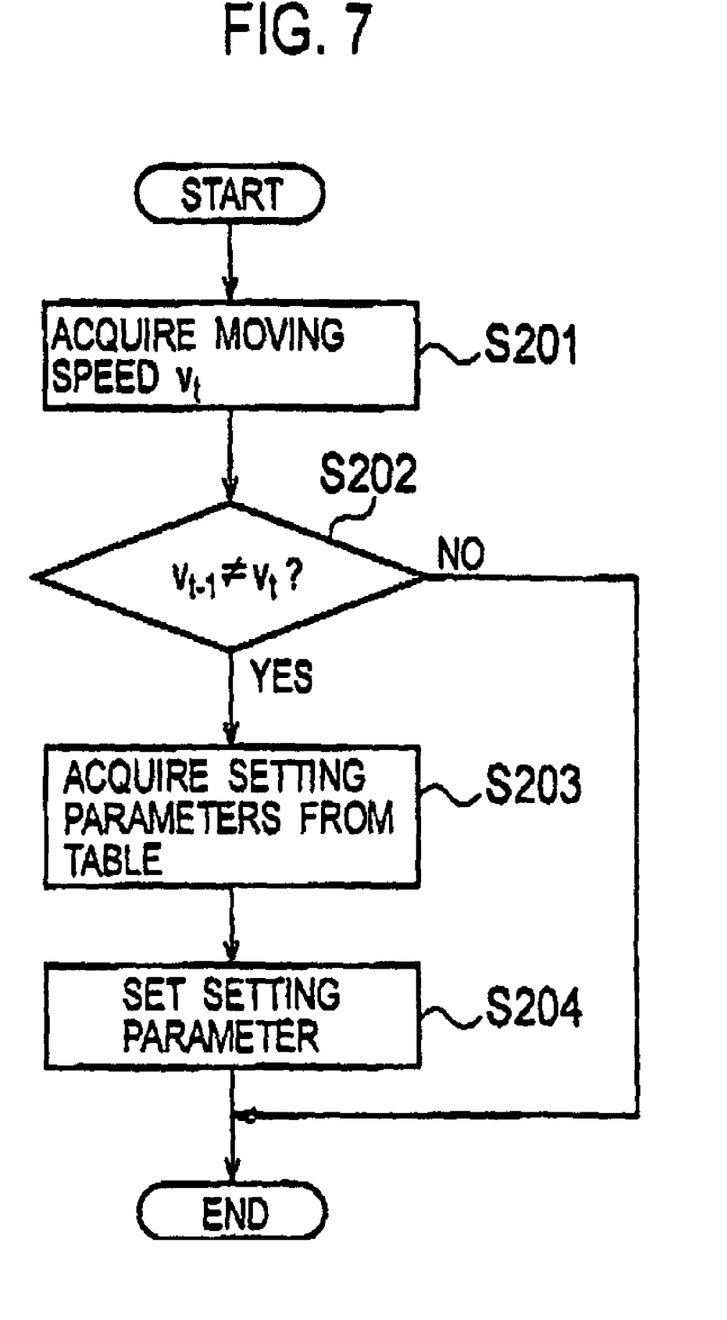
FIG. 7 shows a flow of operations of the mobile communication terminal according to the second modified example.

FIG. 7 is a flowchart illustrating the flow of operations of the mobile communication terminal 1 according to this modified example. In the flowchart shown in FIG. 7, the setting parameters are acquired from the table in step S203 so as to correspond to the moving speed $v_t$ that has been obtained in step S201. In this respect, the operations shown in the flowchart of FIG. 7 differs from the operations shown in the flowchart of FIG. 4.

In the configuration of this modified example, the setting parameters are not calculated from the moving speed of the mobile communication terminal 1. Instead, setting parameters corresponding to the moving speed are acquired from the table that has been provided in advance. Consequently, the load for processing on the mobile communication terminal 1 can be reduced in this modified example from the load in the case of the above-described embodiment.

Other Embodiments

The present invention has been described thus far using an embodiment and its modified examples. It should be understood that the present invention is not limited by the descriptions or the drawings, though these descriptions and drawings form parts of the disclosure. Those skilled in the art can easily understand that various alternative embodiments, examples, and applications are conceivable.

In the above-described embodiment, the moving-speed acquiring unit 1051 is configured to acquire the moving speed as the moving state of the mobile communication terminal 1, but what is to be acquired in the present invention is not limited to the moving speed. Alternatively, the moving-speed acquiring unit 1051 may be configured to acquire information indicating the state of the mobile communication terminal 1, that is, information on whether the mobile communication terminal is in a stationary state or is moving. In this case, the load for processing on the mobile communication terminal 1 can be reduced significantly.

In addition, the long-term reception quality measured in the above-described embodiment is the reception BLER, but the quality to be measured for this purpose in the present invention is not limited to the reception BLER. In an alternative configuration, the reception bit error rate (reception BER) is to be measured.

Moreover, the mobile communication system of the above-described embodiment is a system of a CDMA, but the system of the present invention is not limited to a CDMA system. The above-described transmission power controlling method is applicable to a mobile communication system of a different type.

It should be understood that the present invention includes various embodiments that are not described in this specification. Rather, the present invention is defined only by the claims relevant to this disclosure.

What is claimed is:

1. A mobile communication terminal comprising:
a transmission power controller configured to measure a first reception quality of a signal received from a base station, and to control a transmission power of the base station in accordance with a result of comparison between the first reception quality and a target value of the first reception quality;
a target value updater configured to measure a second reception quality of the received signal, and to update the target value in accordance with a measurement result of the second reception quality; and
a measurement controller configured to acquire a moving speed or a moving state of stationary or non-stationary of the mobile communication terminal, and to simultaneously control so that the period of measuring the second reception quality and the cycle of updating the target value become longer when the moving speed is slower than a prescribed value or the mobile communication terminal is in the stationary state, and to simultaneously control so that the period of measuring the second reception quality and the cycle of updating target value become shorter when the moving speed is faster than the prescribed value or the mobile communication terminal is in the non-stationary state.

2. The mobile communication terminal according to claim 1, wherein the first reception quality is a reception quality used in an inner-loop control, and the second reception quality is a reception quality used in an outer-loop control.

3. The mobile communication terminal according to claim 1, wherein the first reception quality is an instantaneous reception quality, and the second reception quality is a long-term reception quality that is a reception quality measured over a longer period of time than a period of time over which the instantaneous reception quality is measured.

4. The mobile communication terminal according to claim 1, wherein the measurement controller is configured to acquire, as the moving state, a moving speed of the mobile communication terminal.

5. The mobile communication terminal according to claim 1 wherein the transmission power controller is configured to transmit, to the base station, a control command to control the transmission power of the base station, and the measurement controller is configured further to control a period of measuring the first reception quality and a cycle of transmitting the control command.

6. The mobile communication terminal according to claim 1, wherein the measurement controller is configured to change the period of measuring and the cycle of updating only on condition that a moving state acquired newly on this occasion differs from a moving state having been acquired on the previous occasion.

7. A transmission power controlling method comprising the steps of:
measuring a first reception quality of a signal received from a base station;

controlling a transmission power of the base station in accordance with a result of comparison between the first reception quality and a target value of the first reception quality;

measuring a second reception quality of the received signal;

updating the target value in accordance with a measurement result of the second reception quality;

acquiring a moving speed or a moving state of stationary or non-stationary of a mobile communication terminal; and simultaneously controlling a period of measuring the second reception quality and a cycle of updating the target value so that the period of measuring the second reception quality and the cycle of updating the target value become longer when the moving speed is slower than a prescribed value or the mobile communication terminal is in the stationary state, and so that the period of measuring the second reception quality and the cycle of updating target value become shorter when the moving speed is faster than the prescribed value or the mobile communication terminal is in the non-stationary state.

* * * * *